(12) United States Patent
Chappaz et al.

(10) Patent No.: US 10,955,923 B2
(45) Date of Patent: Mar. 23, 2021

(54) VIBRATING TACTILE TILE

(71) Applicant: HAP2U, Saint-Martin-d'Hères (FR)

(72) Inventors: Cedric Chappaz, Saint-Martin-d'Hères (FR); Eric Vezzoli, Saint-Martin-d'Hères (FR)

(73) Assignee: HAP2U, Saint-Martin-d'Hères (FR)

( * ) Notice: Subject to any disclaimer, the term of this patent is extended or adjusted under 35 U.S.C. 154(b) by 0 days.

(21) Appl. No.: 16/475,559

(22) PCT Filed: Jan. 3, 2018

(86) PCT No.: PCT/FR2018/050017
§ 371 (c)(1),
(2) Date: Jul. 2, 2019

(87) PCT Pub. No.: WO2018/127662
PCT Pub. Date: Jul. 12, 2018

(65) Prior Publication Data
US 2019/0339779 A1    Nov. 7, 2019

(30) Foreign Application Priority Data

Jan. 4, 2017    (FR) ..................... 17/50070

(51) Int. Cl.
*G06F 3/01* (2006.01)
*G06F 3/041* (2006.01)
*H04M 1/02* (2006.01)

(52) U.S. Cl.
CPC .............. *G06F 3/016* (2013.01); *G06F 3/041* (2013.01); *H04M 1/0266* (2013.01); *G06F 2203/04103* (2013.01)

(58) Field of Classification Search
CPC ........... G06F 2203/04103; G06F 3/016; G06F 1/1626; G06F 3/041; H04M 1/0266;
(Continued)

(56) References Cited

U.S. PATENT DOCUMENTS

| | | | |
|---|---|---|---|
| 5,105,116 A * | 4/1992 | Okamoto | B06B 1/06 310/311 |
| 2011/0141046 A1* | 6/2011 | Sato | G06F 3/016 345/173 |

(Continued)

FOREIGN PATENT DOCUMENTS

| | | |
|---|---|---|
| CA | 2835348 A1 | 11/2012 |
| CN | 101632054 A | 1/2010 |

(Continued)

OTHER PUBLICATIONS

Authorized Officer: Benzina, Amal, International Search Report issued in PCT application No. PCT/FR2018/050017, dated Apr. 5, 2018, 2 pp.

(Continued)

*Primary Examiner* — Hong Zhou
(74) *Attorney, Agent, or Firm* — Kaplan Breyer Schwarz, LLP

(57) ABSTRACT

A vibrating touch screen includes a plate; two first elongated portions approximately parallel to each other, having an acoustic reflection coefficient greater than that of the plate, and connected to a first surface of the plate; and two strips of piezoelectric actuators approximately parallel to the portions and located therebetween.

13 Claims, 2 Drawing Sheets

(58) Field of Classification Search
CPC ............ H04M 19/047; H04M 2250/22; H04R 17/00; H04R 2400/03; H04R 2499/11
See application file for complete search history.

(56) References Cited

U.S. PATENT DOCUMENTS

| | | | |
|---|---|---|---|
| 2012/0162143 A1 | 6/2012 | Kai et al. | |
| 2012/0242593 A1* | 9/2012 | Kim | H01L 41/09 345/173 |
| 2012/0249459 A1* | 10/2012 | Sashida | G06F 3/016 345/173 |
| 2013/0064401 A1* | 3/2013 | Wang | H04R 7/26 381/191 |
| 2013/0285506 A1* | 10/2013 | Takeda | H02N 2/001 310/317 |
| 2014/0327839 A1 | 11/2014 | Giraud et al. | |
| 2015/0341714 A1* | 11/2015 | Ahn | H04R 7/045 381/333 |
| 2016/0309263 A1* | 10/2016 | Kanemaki | G06F 1/1688 |
| 2018/0052567 A1* | 2/2018 | Miyamoto | G06F 3/01 |
| 2018/0267607 A1* | 9/2018 | Chappaz | G06F 1/1684 |

FOREIGN PATENT DOCUMENTS

| | | |
|---|---|---|
| EP | 1956466 A1 | 8/2008 |
| EP | 2432126 A2 | 3/2012 |
| EP | 2707787 B1 | 12/2016 |
| FR | 2951027 A1 | 4/2011 |
| FR | 2975197 A1 | 11/2012 |
| JP | 2010-518500 A | 5/2010 |
| JP | 2014-513370 A | 5/2014 |
| WO | 98/29853 A1 | 7/1998 |
| WO | 2008/116980 A1 | 10/2008 |
| WO | 2012/053061 A1 | 4/2012 |
| WO | WO-2016170601 A1 * 10/2016 ............ G06F 3/043 |

OTHER PUBLICATIONS

Written Opinion of the International Searching Authority issued in counterpart PCT application No. PCT/FR2018/050017, dated Apr. 5, 2018, 7 pp.

\* cited by examiner

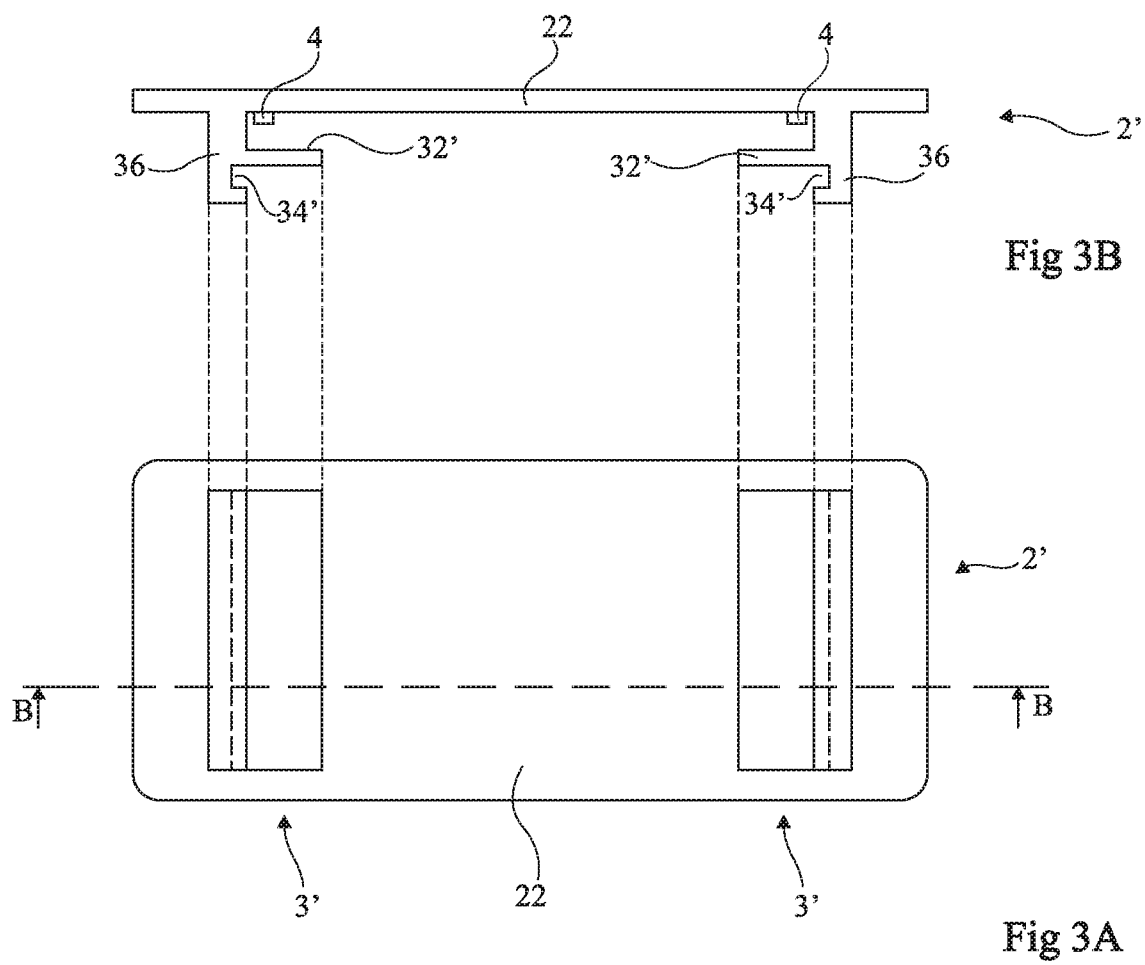

VIBRATING TACTILE TILE

The present patent application claims the priority benefit of French patent application FR17/50070 which is herein incorporated by reference.

BACKGROUND

The present disclosure generally concerns touch screens for electronic devices and, more particularly, the forming of a vibrating touch screen, comprising piezoelectric actuators.

DISCUSSION OF THE RELATED ART

Touch screens are widely used in many electronic devices and, more particularly, to create touch-sensitive displays, for example, for cell phones, touch pads, control interfaces, etc.

Among the technologies used to create touch screens, the present disclosure more particularly applies to touch screens capable of modifying the touch feeling, and using piezoelectric actuators to generate ultrasound waves.

SUMMARY

An embodiment provides a solution improving the resonance of a vibrating touch screen.

An embodiment provides a solution enabling to homogenize the propagation of ultrasound waves over a useful surface area of the touch screen.

An embodiment provides a solution particularly adapted to touch screens strained at their periphery.

Thus, an embodiment provides a vibrating touch screen, comprising:
a plate;
two first elongated portions approximately parallel to each other, having an acoustic reflection coefficient greater than that of the plate, and connected to a first surface of the plate; and
two strips of piezoelectric actuators approximately parallel to said portions and located therebetween.

According to an embodiment, said first portions are thicker than the plate.

According to an embodiment, the touch screen further comprises second elongated portions, parallel to each other and to the first portions, having an acoustic reflection coefficient smaller than that of the plate and than that of the first portions and arranged outside of an area delimited by said first portions.

According to an embodiment, holes are formed outside of said area.

According to an embodiment, said portions form Bragg resonators.

According to an embodiment, the second portions are thinner than the plate.

According to an embodiment, said first portions protrude perpendicularly to a plane containing the plate.

According to an embodiment, said first portions are contained in a plane parallel to a plane containing the plate.

According to an embodiment, said first portions are connected to the plate by third portions protruding perpendicularly to a plane containing the plate.

According to an embodiment, the touch screen forms a vibrating touch screen for a cell phone, a tablet, a watch, or a computer screen.

An embodiment provides an electronic device, comprising a touch screen.

An embodiment provides a cell phone comprising a touch screen.

BRIEF DESCRIPTION OF THE DRAWINGS

The foregoing and other features and advantages will be discussed in detail in the following non-limiting description of specific embodiments in connection with the accompanying drawings, in which:

FIGS. 3A and 3B very schematically show another embodiment of a vibrating touch screen.

DETAILED DESCRIPTION

Figure 1:
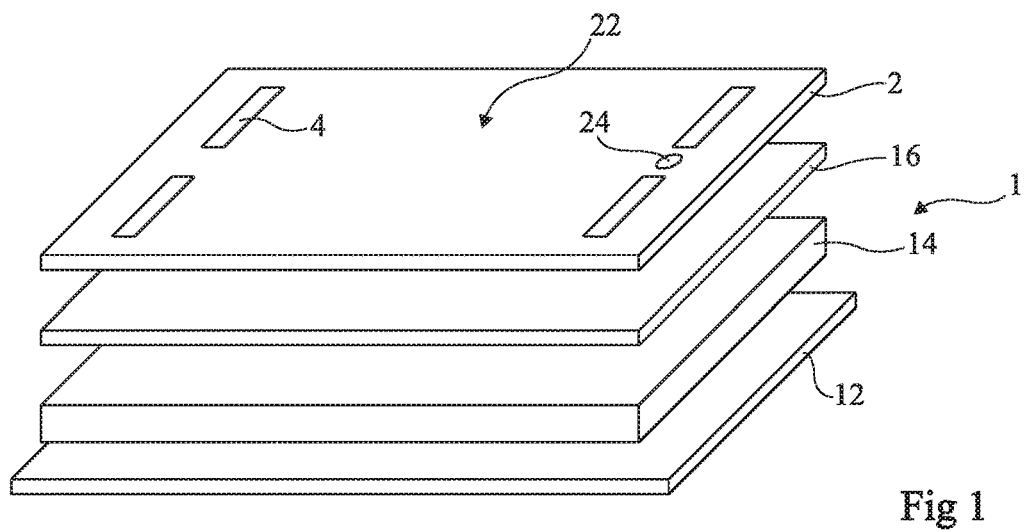
FIG. 1 is a very simplified representation in exploded perspective view of an example of a device equipped with a touch screen of the type to which the described embodiments apply.

For clarity, only those elements which are useful to the understanding of the described embodiments have been shown and will be detailed. In particular, the control of the piezoelectric elements of the vibrating touch screen or interface has not been detailed, the described embodiments being compatible with usual control methods and circuits. Further, the other elements and circuits of the electronic device have not been detailed either, the described embodiments being here again compatible with usual elements and circuits.

It should be noted that, in the drawings, the structural and/or functional elements common to the different embodiments may be designated with the same reference numerals and may have identical structural, dimensional, and material properties. Further, when reference is made to terms qualifying absolute positions, such as terms "front", "rear", "top", "bottom", "left", "right", etc., or relative positions, such as terms "above", "under", "upper", "lower", etc., or to terms qualifying directions, such as "vertical", "horizontal", etc., it is referred, unless otherwise mentioned, to the orientation of the drawings or to a normal position of use. The terms "approximately", "substantially", and "in the order of" are used herein to designate a tolerance of plus or minus 10%, preferably of plus or minus 5%, of the value in question, or of plus or minus 10°, preferably of plus or minus 5°.

FIG. 1 is a very simplified representation in exploded perspective view of an example of a device 1 equipped with a touch screen of the type to which the described embodiments apply.

Reference will be made hereafter to a cell phone of smartphone type. However, all that will be described more generally applies to any electronic device or equipment comprising a vibrating touch screen, for example, a tablet, a computer screen, a watch, a medical device, a mobile terminal, a touch pad, etc.

Device 1 generally comprises a support or package 12 having one or a plurality of elements (symbolized by a block 14) housed therein, for example, a processing unit, memories, a battery, wireless communication interfaces, various processing circuits, and other devices. A display screen 16 generally covers the assembly to maximize the display surface. The screen is topped with a plate 22 made of glass, or plastic, or of another transparent material forming a vibrating touch screen or interface 2. For this purpose, piezoelectric elements 4 are generally arranged under plate 22. The shape (contour) of plate 22 is adapted to the shape of the device and in particular of its screen 16, and generally comprises holes 24 or areas dedicated to the passage of buttons, actuators, etc. or to the access to accessories of sound, image sensor type, etc.

Examples of structures and of principles of control and of operation of a vibrating touch screen of the type to which the embodiments of the present disclosure apply are described in documents FR-A-29755197, WO-A-201253061, EP-A2707787, US-A-2014327839, JP-A-2014513370, CA-A-2835348, and WO-A-2008116980, EP-A-1956466, JP-A-2010518500, CN-B-101632054, which are considered as forming part of the present disclosure. They are incorporated herein by reference in the conditions authorized by law.

Such vibrating touch screens use piezoelectric elements to generate standing (ultrasound) acoustic surface waves enabling to create a vibrating touch interface to provide the user with sensations of texture, thickness, etc. The above technologies use so-called Lamb or Rayleigh waves.

For simplification, the following example of a smartphone having a glass plate as its surface plate is considered.

In a smartphone, a difficulty lies in the fact that the glass plate is often embedded and/or glued at the periphery. Further, the plate generally comprises holes for sound or image sensors and buttons. All this generates a damping of the surface waves generated by the piezoelectric actuators, which adversely affects the efficiency of the vibrating touch interface.

In the embodiments described hereafter, it is provided to form the touch screen in a specific manner to confine the vibrations within a determined area to decrease the damping of the generated waves and to provide vibrations of homogeneous intensity in a useful area.

More particularly, it is provided to fit two sides of the touch screen with structures forming Bragg resonators to concentrate the vibrations between the two structures.

The Bragg resonator theory is known per se. By placing two Bragg resonators or mirrors face to face, the acoustic waves generated between the two resonators are contained in the surface separating them.

By arranging two Bragg resonators at the ends of a so-called useful area of the vibrating touch screen, the hole-type disturbing elements being located outside of this area, the damping of vibrations generated by piezoelectric elements arranged between the Bragg resonators is considerably decreased.

Figure 2A:
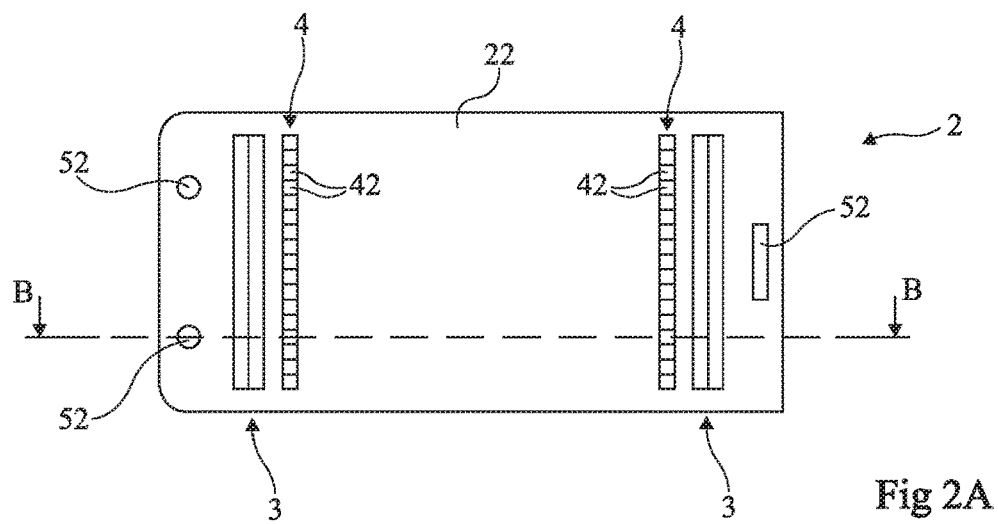
FIGS. 2A and 2B very schematically show an embodiment of a vibrating touch screen.
Figure 2B:
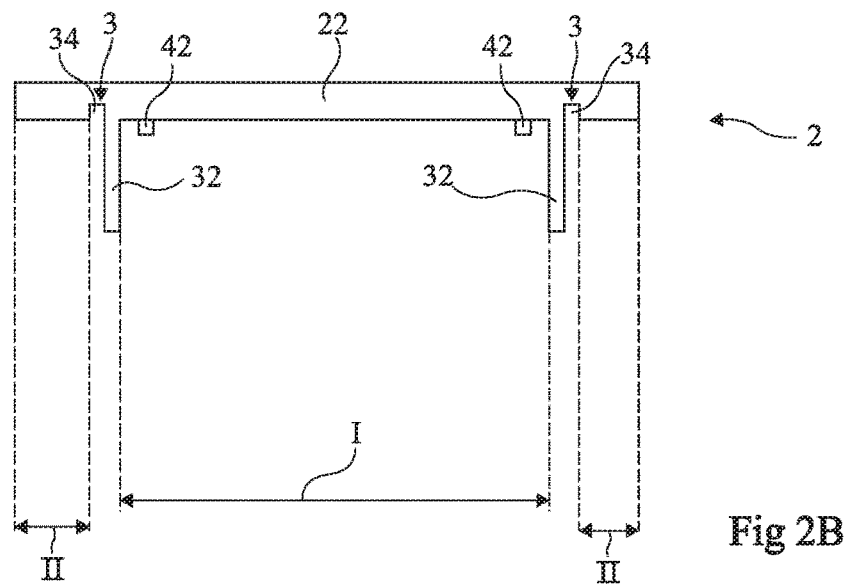

FIGS. 2A and 2B very schematically shows an embodiment of a vibrating touch screen. FIG. 2A is a bottom view. FIG. 2B is a cross-section view along line B-B of FIG. 2A.

Touch screen 2 comprises a glass plate 22, for example, approximately rectangular, having two Bragg resonators 3 face to face formed in their small sides. Each resonator 3 comprises at least two parallel strips having different acoustic reflection indexes. In the example of FIGS. 2A and 2B, it is assumed that the strips are made of the same material (the glass of plate 22) in the form of a first rectangular reflection portion or wall 32 perpendicular to the surface of plate 22 and of a damping slot or second portion 34, also rectangular, behind wall 32 with respect to the middle of plate 22.

Walls 32 delimit together a useful touch area I, that is, the area of touch screen 2 where the vibrations are felt by the user. In the example of FIGS. 2A and 2B, two strips of piezoelectric actuators 4, for example, rows of ceramic point-like elements 42 or strips of piezoelectric material sputtered in a thin film, are formed parallel to walls 32, on the side opposite to slots 34 (at the longitudinal ends of useful area I). Strips 4 are formed as close as possible to walls 32, taking into account the constraints of the manufacturing technique used.

Outside of the longitudinal space delimited by resonators 3, areas II of touch screen 2 are lost in terms of touch interface, but are used to house the different elements which would disturb the homogeneity of the acoustic reflection index in useful area I. In particular, in such areas II, glass plate 22 preferably comprises openings 52 used for the passage of buttons or other members of control of and access to sound and image sensors. Thus, the resonance in central area I is improved.

In very simplified fashion, assuming that the walls are made of the same material as the plate, they have a greater reflection index than the central area, which takes part in the reflection of the acoustic waves towards the other wall, and the slots have a smaller reflection index than the rest of the plate and thus favor the damping of the waves which cross the walls and come out of the useful area.

Preferably, the ends (the lower portions) of wall 32 are blocked, that is, are held at the bottom of the smartphone package. However, only their ends should be blocked, without hindering their other surfaces (the lateral surfaces). Thus, the rest of the smartphone components, under touch screen 2, are arranged or formed to have openings for the passage of walls 32, all the way to the back of the package. For example, in the presence of a printed circuit wafer, the latter is open vertically in line with walls 32. An advantage of blocking the end of the Bragg resonator is that this gives it a quasi-infinite length (here, the height in the orientation of FIG. 2B), and thus a better ability to concentrate acoustic waves in useful area I.

Portions 32 extend from one longitudinal edge to the other of the touch screen, for example, by only leaving a space necessary to the affixing of the longitudinal edges of plate 22.

The height of portions 32 depends on their acoustic reflection index and on the frequency band of the vibrations which are desired to be contained in central area I.

In the example of a vibrating touch screen, the ultrasound frequencies used are, for example, in the range from approximately 20 kHz to approximately 100 kHz. This results in a wavelength in the range from approximately 5 to 15 millimeters. With portions 32 having free ends, a 15-millimeter height may be incompatible with the thickness of the smartphone. By blocking the end of portions 32, the height of portions 32 can be decreased to approximately from 5 to 10 millimeters if they are made of the same material as plate 22, which will most often be compatible with the thickness of a smartphone.

Bragg resonators 3 may, according to the embodiments, be formed in one piece with plate 22 (for example, by molding, or by extrusion from a thick plate) or be totally or partly bonded. For example, slots 34 are machined in plate 22 and vertical portions 32 are bonded to the plate.

Further, portions 32 are not necessarily made of glass or transparent. Further, they may be made of copper, of tungsten, of aluminum, etc., of plastic, or of a combination of different materials. Further, slots 34 may be filled with another material to adjust the acoustic reflection coefficient and improve the damping. According to another embodiment, rather than forming a slot and a vertical portion, a plurality of parallel strips (two or more) having different acoustic reflection coefficients are placed on the back side of plate 22. In the example of FIGS. 2A and 2B, it can be considered that portions 32 are thicker than plate 22 and that portions 34 are thinner than plate 22.

It could have been believed that the fact of blocking the longitudinal edges of touch screen 2, for example, by gluing them or by embedding them in the shell of the smartphone, would adversely affect the propagation of the piezoelectric resonance. However, the fact of placing actuators 4 on either side lengthwise takes part in directing acoustic waves in the longitudinal direction, which becomes the main direction.

FIGS. 3A and 3B very schematically show another embodiment of a vibrating touch screen 2'. FIG. 3A is a bottom view. FIG. 3B is a cross-section view along line B-B of FIG. 3A.

According to this embodiment, Bragg resonators or mirrors 3' are arranged horizontally, that is, the (first) reflection portions 32' are parallel to the surface of plate 22 and non-perpendicular, as in the embodiment of FIGS. 2A and 2B. Portions 32' are supported by (third) vertical portions 36 (perpendicular to the plane of plate 22) having free respective ends. Damping slots (second portions) 34' are formed between portions 32' and the ends of portions 36. The ends of portions 32' are preferably fixed. Such an affixing is, at least in the case of a smartphone, easier than in the embodiment of FIGS. 2A and 2B. Indeed, the back side of a smartphone generally is a removable shell providing access to the battery and to cards (SIM and memory). Accordingly, it may be inconvenient to affix thereto the ends of walls 32 of FIGS. 2A and 2B. It is here preferable for the ends of portions 36 to be free and it is thus easy to leave them floating through the passages formed, if necessary, in the elements located between the plate and the shell. Further, the ends of portions 32' may be easily affixed to other fixed portions of the smartphone such as, for example, a printed circuit wafer supporting components.

The (vertical) spacing between the back side of plate 22 and portions 32' depends on the thickness of piezoelectric actuators 4 which are, in this embodiment, inside of area I defined by vertical portions 36 and close to these portions.

An advantage of the described embodiments is that by using Bragg resonators, a reflection close to a total reflection can be achieved, which enables, on the one hand, to concentrate acoustic waves in useful area I and, on the other hand, to homogenize the propagation in the useful area. In particular, advantage is taken from the fact that the control member and openings usually present in the screen of a smartphone are generally arranged at the longitudinal ends. Thus, the division performed by the Bragg resonators takes part in eliminating the damping elements from the useful area.

Another advantage is that the described embodiments are compatible with the small thickness of a smartphone and respect its general architecture and, in particular, the useful areas of the screen.

The sizing of the Bragg resonators is for example empirically performed on design of the vibrating touch screen. For example, it can be started by theoretically solving the sizings of an ideal Bragg resonator according to the different dimensions of the touch screen and to the acoustic reflection indexes, and then adjusting the dimensions by successive trials aiming at decreasing the height of portion 32 or 32'.

Another advantage of the described embodiments is that they decrease the damping of the waves generated by the piezoelectric actuators without increasing the thickness of the touch screen and while being compatible with an affixing thereof at its periphery or an embedding of its periphery.

Various embodiments and variations have been described. Certain embodiments and variations may be combined and other variations and modifications will occur to those skilled in the art. In particular, the dimensions and arrangements of the resonator portions vary according to applications. Further, although the embodiments have been described in relation with an example applied to a smartphone, they easily transpose to other electronic devices with a transparent vibrating touch screen where similar problems are posed, in particular, where it is desired to have a transparent useful area with a homogeneous acoustic propagation and to integrate a Bragg resonator without increasing the thickness off the device.

Finally, the practical implementation of the embodiments and variations which have been described is within the abilities of those skilled in the art based on the functional indications given hereabove.

The invention claimed is:

1. A vibrating touch screen, comprising:
   a plate;
   two first elongated portions thicker than the plate, approximately parallel to each other and protruding from the plate or connected thereto by protruding portions, having an acoustic reflection coefficient greater than that of the plate, and connected to a first surface of the plate; and
   two strips of piezoelectric actuators approximately parallel to said first elongated portions and located therebetween; and
   two second elongated portions, parallel to each other and to the first elongated portions, having an acoustic reflection coefficient smaller than that of the plate and than that of the first elongated portions, and arranged outside of an area delimited by said first portions.

2. The touch screen of claim 1, wherein holes are formed outside of said area.

3. The touch screen of claim 1, wherein said portions form Bragg resonators.

4. The touch screen of claim 1, wherein the second elongated portions are thinner than the plate.

5. The touch screen of claim 1, wherein said first elongated portions protrude perpendicularly to a plane containing the plate.

6. The touch screen of claim 1, wherein said first elongated portions are contained in a plane parallel to a plane containing the plate.

7. The touch screen of claim 6, wherein said first elongated portions are connected to the plate by third portions protruding perpendicularly to a plane containing the plate.

8. The touch screen of claim 1, forming a vibrating touch screen for a smartphone, a tablet, a watch, or a computer screen.

9. An electronic device, comprising the touch screen of claim 1.

10. A cell phone comprising the touch screen of claim 1.

11. The touch screen of claim 1, wherein the thickness of said first elongated portions depends on a frequency band of vibrations to be contained in said area delimited by said first elongated portions.

12. The touch screen of claim 1, wherein said first elongated portions are protruding from a largest thickness of the plate in said area delimited by said first elongated portions.

13. The touch screen of claim 1, wherein said second elongated portions form damping slots in the plate.

* * * * *